Patented Dec. 30, 1924.

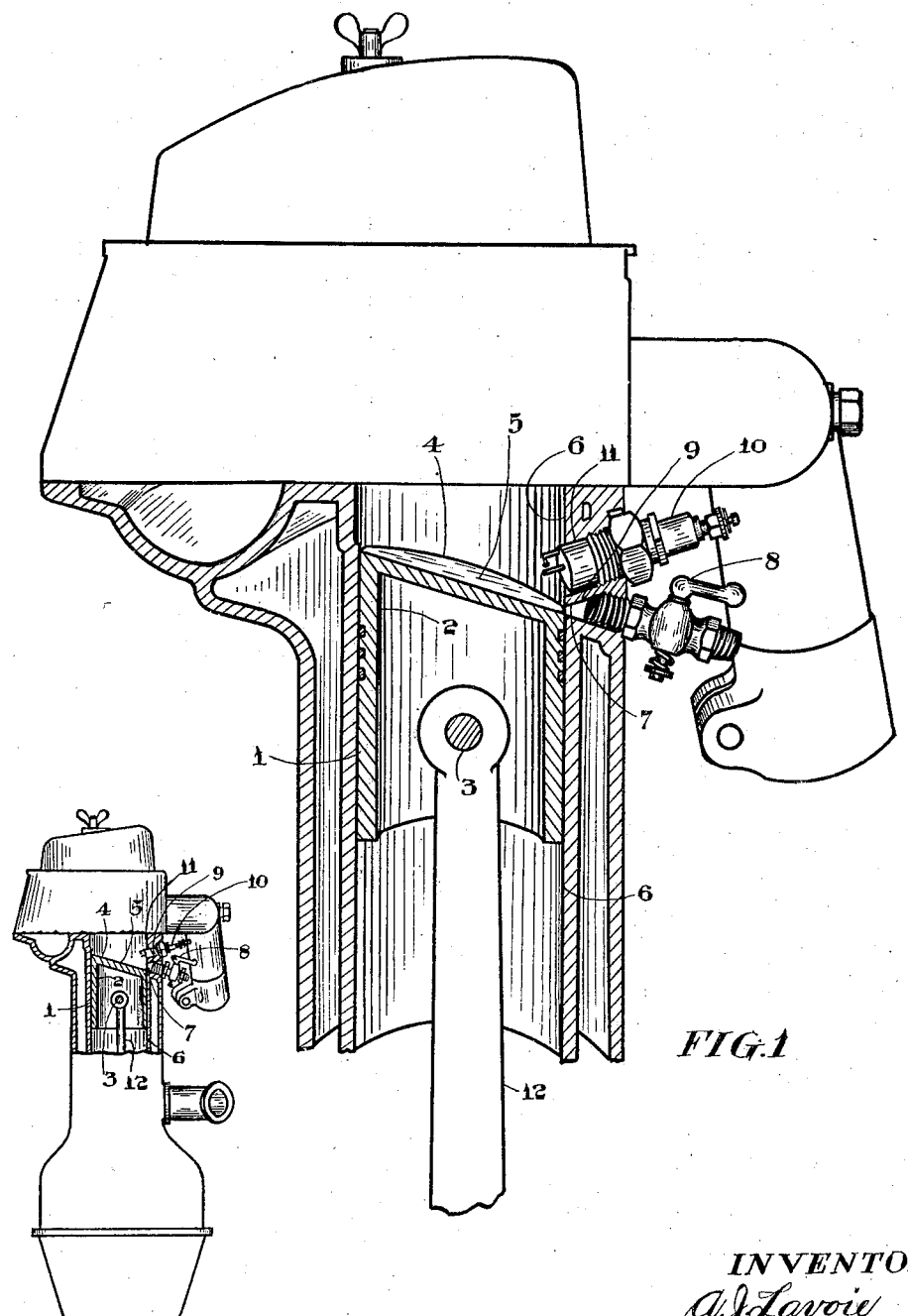

1,520,875

UNITED STATES PATENT OFFICE.

ALPHONSE JOSEPH LAVOIE, OF MONTREAL, QUEBEC, CANADA.

INTERNAL-COMBUSTION ENGINE.

Application filed December 9, 1920, Serial No. 429,483. Renewed September 29, 1924.

*To all whom it may concern:*

Be it known that I, ALPHONSE JOSEPH LAVOIE, and residing at 294 Wilson Avenue, in the city and District of Montreal, in the Province of Quebec, in the Dominion of Canada, have invented new and useful Internal-Combustion Engines, of which the following is the specification.

The invention relates to internal combustion engines as described in the present specification and illustrated in the accompanying drawings that form part of the same.

The invention consists essentially of the novel means employed whereby the explosion chamber is relieved of the accumulation of refuse oils, thereby avoiding the deposit of carbon and its ultimate deleterious effects.

The objects of the invention are to maintain the efficiency of the engine throughout varying conditions of feed and service; to economize in the consumption of fuel and lubricant; to reduce the cost of maintenance in gasoline motors; to facilitate the ignition of the charge; and generally to provide a reliable, durable and efficient engine.

In the drawings, Figure 1 is a sectional perspective view, showing portions of the cylinder and piston and the explosion chamber.

Figure 2 is a vertical view showing the engine cylinder partially in section.

Like numerals of reference indicate corresponding parts in each figure.

Referring to the drawings, the piston 1 is formed with the customary cylindrical shaped wall 2, having the wrist pin 3 thereacross and the inclined head 4 forming the face 5 sloping to the inner wall of the cylinder 6 at the drain opening 7 into which the pet cock 8 is screw-threaded, the wall of said opening from the upper side converging at 9 to accommodate the spark plug 10 in the opening 11.

The drain opening 7 is slightly below the face of the piston head 4 at the extremity of the upstroke of the piston 1 and rod 12, and has the same slope, consequently all accumulations of oil, whether lubricant or gasoline must flow to said opening 7 where it collects as far as the valve of the pet cock, which is opened occasionally to draw away the collection.

In this way the explosion chamber is maintained in a clean condition, so that there is a minimum quantity of lubricant oil to carbonize and no surplus liquid gasoline to reduce the efficiency of the engine.

It may also be mentioned that where the cylinders of an engine are themselves inclined there will be less occasion to form the piston head faces with a considerable slope, in fact in some cases the incline will in itself be sufficient to run off the oil into the drain opening.

What I claim is:—

In an internal combustion engine, a cylinder having a sloping drain opening from the explosion chamber having its upper side converging to accommodate an opening for the spark plug, a spark plug screw-threaded into the latter opening, a pet cock screw-threaded into the drain opening and a piston having an inclined head forming a face flush with said drain opening in the uppermost position of the piston.

Signed at Montreal, Quebec, Canada, this second day of December, 1920.

ALPHONSE JOSEPH LAVOIE.